Patented Aug. 4, 1953

2,647,884

UNITED STATES PATENT OFFICE 2,647,884

ISOCYANATES AND PRODUCTS PREPARED THEREFROM AND METHODS OF MAKING THE SAME

Vernon P. Wystrach, Springdale, Conn., assignor to American Cyanamid Company, New York, N. Y., a corporation of Maine No Drawing. Application March 31, 1950, Serial No. 153,300

28 Claims. (Cl. 260—47)

This invention relates to new and useful chemical compounds and other compositions of matter. More particularly the invention is concerned with new isocyanates, products prepared therefrom and methods of making the same. Still more particularly the invention relates to isocyanates represented by the general formula I         RO—Ar—N=C=O wherein R represents a monovalent, primary, ethylenically unsaturated, aliphatic radical having at least 3 and not more than 8 carbon atoms, and Ar represents a divalent aromatic hydrocarbon radical. In all of the compounds embraced by the above formula the —OR and —N=C=O (isocyanate) groupings are each attached directly to the aromatic nucleus of the divalent aromatic radical. The scope of the invention also includes polymers, copolymers and other products from the aforementioned isocyanates, as well as methods of preparing the said isocyanates, polymers, copolymers and other products.

Illustrative examples of divalent aromatic hydrocarbon radicals represented by Ar in Formula I are phenylene, xenylene, naphthylene, etc., as well as the various divalent aliphatic-substituted aromatic hydrocarbon radicals, e. g., 2,4-tolylene, methyl-1,4-phenylene, ethyl-2,5-phenylene, isopropyl-3,4-phenylene, 1-butyl-2,4-naphthylene, etc. Alternatively, Ar may be defined as being an alkyl-substituted benzene nucleus, more particularly a lower alkyl-substituted benzene nucleus (e. g., a mono- or dimethyl-, mono- or diethyl-, mono- or dipropyl-, mono- or diisopropyl-, mono- or dibutyl-substituted benzene nucleus, etc.), a biphenyl nucleus, a terphenyl nucleus, a naphthalene nucleus, a methyl or other alkyl-substituted biphenyl, terphenyl or naphthalene nucleus, etc. Illustrative examples of ethylenically unsaturated, monovalent radicals represented by R in Formula I are allyl, 2-chloroallyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-hexenyl, etc. Due to the ethylenic unsaturation present therein, the groupings represented by R in Formula I are polymerizable, that is to say, polymerization of the isocyanates of my invention can take place through this grouping.

Preferred classes of chemical compounds which are produced in accordance with the present invention are isocyanates represented by the general formula II 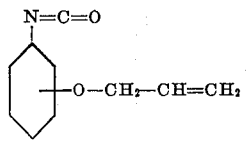

(which formula also may be written as

)

more particularly o-, m-, and p-allyloxyphenyl isocyanates and mixtures thereof (e. g., a mixture of m-allyloxyphenyl isocyanate and p-allyloxyphenyl isocyanate); and chemical compounds represented by the general formula III 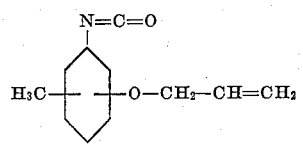

more particularly 2-methyl-3-allyloxyphenyl isocyanate, 2-methyl-4-allyloxyphenyl isocyanate, 2-methyl-5-allyloxyphenyl isocyanate, 2-methyl-6-allyloxyphenyl isocyanate, 3-methyl-2-allyloxyphenyl isocyanate, 3-methyl-4-allyloxyphenyl isocyanate, 3-methyl-5-allyloxyphenyl isocyanate, 3-methyl-6-allyloxyphenyl isocyanate, 4-methyl-2-allyloxyphenyl isocyanate, 4-methyl-3-allyloxyphenyl isocyanate, and mixtures thereof.

The present invention also provides compositions comprising a product of polymerization of a polymerizable mass, said mass including a compound represented by the general formula

wherein Ar represents a divalent aromatic hydrocarbon radical, R represents a monovalent, primary, ethylenically unsaturated, aliphatic radical having at least 3 and not more than 8 carbon atoms, and the —OR and isocyanate groupings are each attached directly to the aromatic nucleus of the said divalent radical. Also embraced by my invention are substances comprising the product of reaction of (1) a product of polymerization of the kind described in the first sentence of this paragraph, for instance polymeric o-, m- or p-allyloxyphenyl isocyanate, a polymer of an isocyanate embraced by Formula III (e. g., polymeric 2-methyl-5-allyloxyphenyl isocyanate), a copolymer of a mixture of m-allyloxyphenyl isocyanate and p-allyloxyphenyl isocyanate, etc., and (2) a compound containing a hydrogen atom which is reactive with the isocyanate grouping that is present in the polymerization product of (1), for instance compounds containing one or more —OH groups, e. g., alkyd resins containing —OH groups, alcohols, cellulose and cellulose derivatives containing free hydroxyl groups, etc., and nitrogen-containing materials containing hydrogen atoms which are reactive with an isocyanate grouping, e. g., ethylene imine, ethylene diamine, zein, casein, etc.

The present invention also provides polymerizable compositions comprising (1) an isocyanate of the kind represented by Formula I and more specifically by Formulas II and III and (2) a different polymerizable compound, more particularly a monomeric compound, which is copolymerizable with the isocyanate of (1), which contains a $CH_2=C<$ grouping and which is free from a hydrogen atom or atoms reactive with the isocyanate grouping, e. g., styrene, α-methyl styrene, dimethyl styrene, acrylonitrile, methyl acrylate, ethyl acrylate, N-dimethyl and other N-di-(hydrocarbon-substituted) acrylamides and methacrylamides, etc.; and products obtained by polymerizing the above-mentioned polymerizable compositions.

It is an object of the present invention to prepare a new class of chemical compounds, more particularly isocyanates.

Another object of the invention is to prepare a new class of polymerizable, substituted aromatic hydrocarbon isocyanates, the polymerization of which through the polymerizable substituent is more controllable than heretofore has been possible with prior isocyanates containing a polymerizably reactive substituent attached directly to an aromatic hydrocarbon nucleus.

Another object of the invention is to prepare new polymers (homopolymers) and copolymers from the isocyanates of the invention.

Still another object of the invention is to prepare new reaction products and substances or compositions comprising such reaction products from the isocyanate polymers and copolymers of the invention, e. g., hydrolysis and alcoholysis products thereof.

A further object of the invention is to prepare liquid compositions which are especially valuable in treating textile materials, e. g., cotton, wool, rayon, etc., to impart improved properties thereto.

Another object of the invention is to prepare coating, laminating and molding compositions and molded articles utilizing new isocyanate polymers and copolymers. For example, the polymer or copolymer may be used as a binder for a filler or in pre-treating fillers, e. g., alpha-cellulose, wood flour, etc., prior to incorporation in a molding composition.

Still another object of the invention is to provide methods by which the products of the invention may be prepared.

Other objects will be apparent to those skilled in the art from the following more detailed description.

Various isocyanates were known and were suggested for different uses prior to my invention, including 1-alkenyl isocyanates, that is, an isocyanate in which the isocyanate grouping is attached to a carbon atom which is joined to a second carbon atom by an ethylenic bond. Such isocyanates embrace those represented by the formula $R(H)C=C(R')NCO$ in which R and R' each represents hydrogen or a monovalent organic radical. Among the isocyanates included within this class which have been specifically mentioned are 1-phenylvinyl isocyanate, the formula for which is IV 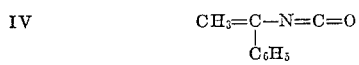

and styryl isocyanate, the formula for which is

V 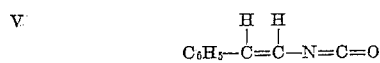

It was also suggested prior to my invention that copolymers of 1-alkenyl isocyanates, specifically vinyl isocyanate, propenyl isocyanate and isopropenyl isocyanate, with a vinyl or vinylidene compound, specifically vinyl acetate, styrene and methyl methacrylate, be prepared.

Isocyanates represented by the general formula $CH_2=CH—Ar—N=C=O$ where Ar represents a divalent aromatic hydrocarbon radical, and wherein the vinyl and isocyanate groupings are each attached directly to the aromatic nucleus of the said divalent radical, also were known prior to my application. Such isocyanates, examples of which are o-, m- and p-vinylphenyl isocyanates, are more fully described (as well as claimed) in Kropa and Nyquist Patent No. 2,468,713. The isocyanates of my invention differ from the aforementioned vinylaryl isocyanates in that the ethylenically unsaturated grouping is not bonded directly to a carbon atom of the aromatic nucleus, but instead is linked to an oxygen atom which, in turn, is bonded to a carbon atom of the aromatic nucleus, the latter also having an isocyanate grouping attached directly to a carbon atom thereof. The isocyanates of the present invention undergo, in general, less rapid polymerization (under the same polymerization conditions) than the aforementioned vinylaryl isocyanates, which is advantageous in that they can be obtained in higher yields (because they undergo polymerization less readily), and it is easier to control their polymerization and the average molecular weight of the polymerization product than is usually possible with the vinylaryl isocyanates. This is a matter of considerable practical importance in the handling of valuable and relatively expensive raw materials, such as the polymerizable isocyanates, and which, when polymerization (or copolymerization) is excessively rapid, may react so quickly that they convert to an insoluble state before they can be applied to the material to be treated, thereby lessening their field of utility.

To the best of my knowledge and belief, the isocyanates embraced by Formula I constitute a new class of chemical compounds. These compounds have unusual and characteristic properties which make them particularly valuable, especially when used in the plastics, coating and textile-treating arts in the form of polymers and copolymers. Likewise, to the best of my knowledge and belief, it was not known prior to my invention that isocyanates of the kind embraced by Formula I would yield, upon polymerization alone or with a compound which is copolymerizable therewith, which contains a single $CH_2=C<$ grouping and which is free from a hydrogen atom or atoms reactive with the isocyanate grouping, polymeric and copolymeric compositions which, when applied in solution or dispersed state to woolen goods and the like, have the particular and peculiar property of imparting shrinkage resistance thereto, and yet effecting this result with a smaller amount of treating agent than generally is required. For example, when a toluene solution of a soluble copolymer of ethyl acrylate and p-allyloxyphenyl isocyanate was applied to a piece of woolen goods and the treated goods was heated to evaporate the solvent and to insolubilize the copolymer, the treated cloth even after five launderings in soap solution for 10 minutes each time, followed by laundering for 1 hour in soap solution, showed a shrinkage of only 4.4%. In marked contrast, untreated woolen cloth when similarly laundered 5 times for 10 minutes each time, followed by 1 hour's laundering, showed a shrinkage of 33.6%. It was quite unexpected and unpredictable that isocyanate compositions of the kind with which this invention is concerned would impart such outstanding shrinkage resistance to an organic fabric, specifically a woolen fabric. Even more surprising was the fact that this shrinkage resistance was imparted to the woolen goods without in any way lessening its softness to the touch, and that these results were obtained by impregnating the woolen fabric with only about 8 to 9% of the copolymer, since with most treating materials about 14 to 16% by weight of treating agent, based on the dry weight of the woolen goods, is required in order to impart satisfactory shrinkage resistance thereto.

As indicated hereinbefore, particularly good results are obtained in the treatment of organic fabric materials (e. g., wool or other protein-containing textile material) with polymerization products, more particularly copolymer compositions, of my invention. It is believed that the linear molecules of the polymerization product, which in all cases contain an average of at least two isocyanate groupings per molecule, react with the fiber molecules of the wool to form a cross-linked polymeric product, and thus aid in forming a shrink-resistant wool. The "soft hand," that is, soft feeling to the touch, may be due to flexible resin linkages between the wool molecules. Usually, when other materials are applied to wool in order to render it shrink-resistant, a harsh finish results due to the fibers becoming drawn together.

By employing isocyanate polymerization products, more particularly copolymer compositions, of the kind hereinbefore described, it is possible to obtain better control of the shrinkage of, for example, wool than is possible by the use of conventional materials. Another advantage is that a lesser amount of treating material than generally is employed produces the desired results. For example, if it is desired to treat cotton or rayon in order to render it shrink-resistant, it is common practice to use approximately 2 to 4% of a conventional resinous material to effect this result. However, if the cotton or rayon material also is to be made crease-resistant, then ordinarily it requires about 8 to 10% of a conventional resin to impart this property to the material. In the case of wool, as much as about 16% of conventional treating material may be required in some cases in order to provide satisfactory shrinkage and crease control of the woolen fabric. By using my new isocyanate polymerization products, specifically copolymer compositions, outstanding shrinkage control and also crease control can be effected with the same amount of treating agent with obvious advantages. Furthermore, the same isocyanate polymerization product may be applied to textile materials made either of cotton, rayon or wool, or may be applied to mixed fabric materials, for example, textiles made of rayon and cotton, rayon and wool, rayon and regenerated fibers (both cellulosic and protein) and the like. An additional advantage, as previously indicated, is that a lesser amount of treating agent is required as compared with conventional materials.

The new isocyanates of my invention possess two entirely different types of functional groups attached directly to an aromatic nucleus, so that they are able to undergo not only a polymerization and copolymerization reaction through the ethylenically unsaturated grouping thereof, but also a condensation reaction through the isocyanate grouping with other reactive compounds, e. g., ethylene imine, bisulfites, malonic esters, other isocyanates, etc. In the compounds of my invention, the chemical stability of the ring nucleus imparts increased stability to the isocyanate compound as a whole, thereby making it easier to effect desired polymerization, copolymerization and condensation reactions. In marked contrast, with isocyanates such, for example, as the 1-alkenylisocyanates, a corresponding chemical stability in the compound as a whole ordinarily does not exist due, for one reason, to the fact that the isocyanate grouping is attached directly to an aliphatic chain. The chemical activity of isocyanates in which the isocyanate grouping is attached directly to an aromatic nucleus also is materially different from that of isocyanates in which the isocyanate grouping is directly attached to a carbon atom of an aliphatic chain. For example, the former are convertible to uretidinediones much more readily than the latter.

As has been indicated hereinbefore, however, one of the most important and practical advantages of my invention resides in fact that it provides polymerizable, substituted aromatic hydrocarbon isocyanates which can undergo polymerization and copolymerization reactions less violently and under better control of the polymerization or copolymerization reaction than is generally true of polymerizably reactive hydrocarbon isocyanates of the class exemplified by the vinylaryl isocyanates. The practical advantages of this characteristic of my new isocyanates previously have been pointed out.

The chemical compounds of my invention, that is, isocyanates of the kind embraced by Formula I, are prepared by effecting reaction between phosgene and a compound represented by the general formula VI    RO—Ar—NH₂ wherein R and Ar have the same meanings as given hereinbefore with reference to Formula I and in which the —OR and —NH₂ groupings are each attached directly to the aromatic nucleus of the divalent aromatic hydrocarbon radical represented by Ar in the above Formula VI. The reaction is effected while the phosgene and the compound represented by Formula VI are in contact with each other in a liquid medium in which they are inert. Thereafter an isocyanate of the kind represented by Formula I is isolated from the reaction mass.

The compound represented by Formula VI can be prepared by hydrolyzing a compound represented by the formula VII    RO—Ar—NHCOCH₃ wherein R and Ar having the same meanings as given hereinbefore with reference to Formula I, using an aqueous hydrochloric acid solution and refluxing the reaction mass. The resulting hydrochloride is converted to the free base by treating it with an alkali-metal hydroxide, e. g., sodium hydroxide.

The compound represented by Formula VII can be obtained in optimum yields in accordance with the following equation:

VIII

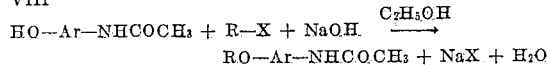

In the above equation R and Ar have the same meanings as given hereinbefore with reference to Formula I, and X represents chlorine, bromine or iodine. The reaction also will proceed using a compound represented by the formula IX $\quad$ 

where Ar has the same meaning as given above with reference to Formula I, as a reactant with the compound represented by R—X instead of the compound represented by

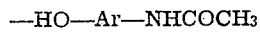

but in general this is not as satisfactory a method as that represented by Equation VIII because of the lower yields obtained.

The reaction between the phosgene and the amine of the kind represented by Formula VI is preferably effected while the said reactants are each dissolved in an inert liquid medium, e. g., benzene, toluene, xylene, chlorobenzene, tetrachloroethane, etc. The temperature of the reaction may be varied over a wide range, e. g., from about —10° C. up to the reflux temperature of the mixed reactants or of solutions of the mixed reactants. In effecting the reaction a suitable procedure is, for example, as follows:

The amine (Formula VI) dissolved in an inert liquid medium is added to the phosgene, also dissolved in an inert liquid medium, while maintaining the reaction mass at, preferably, about 0° C. to —10° C., whereby a carbamyl chloride, RO—Ar—NHCOCl, is formed. The low reaction tempearture favors optimum yield of the carbamyl chloride and minimizes formation of a urea, RO—Ar—NHCONH—Ar—OR. The carbamyl chloride is then converted to the isocyanate by heating the reaction mass at a higher temperature, more particularly to or near the reflux temperature, while passing in a slow stream of phosgene.

In carrying out the reaction briefly described in the preceding paragraphs, an excess of phosgene over that theoretically required for the formation of the isocyanate usually is employed, e. g., from about 1.1 to about 5 or 6 or more moles of phosgene per mole of the amine of the kind represented by Formula VI. It will be understood, of course, that when mixtures of amines of the kind designated by Formula VI are caused to react with phosgene, then the reaction product comprises a mixture of the corresponding substituted aromatic isocyanates, from which the individual compounds can be separated by known methods, e. g., by distillation when the isocyanates produced by the reaction have boiling points sufficiently different from each other.

The polymerization products (polymers and copolymers) of this invention are prepared under anhydrous conditions. The isocyanate monomer or mixture thereof with another monomeric material can be polymerized, for example, under heat, light or heat and light in the presence or absence of a polymerization catalyst such, for instance, as boron fluoride, benzoyl peroxide or other organic peroxide or other catalyst which is free from a hydrogen atom or atoms that would react with the isocyanate grouping. Ultraviolet light is more effective than ordinary light. If desired, the monomeric isocyanate or mixture of copolymerizable materials containing the same can be polymerized in solution state, for instance in solution in an inert organic solvent, e. g., benzene, toluene, xylene, dioxane, ethers (e. g., dibutyl ether), esters (e. g., butyl acetate), chlorobenzene, ethylene dichloride, ketone (e. g., methyl ethyl ketone), etc. The temperature of polymerization may be varied as desired or as conditions may require, but ordinarily is within the range of from about 20° C. to about 150° C. when polymerization is effected in the absence of a solvent. When polymerization is effected in solution state then, depending, for example, upon the particular catalyst employed, it is generally carried out at the boiling temperature of the solution. With certain catalysts, e. g., gaseous boron fluoride, polymerization preferably is effected at a temperature below 20° C., for instance in solution state at 0° to —80° C. In all cases, the temperature of polymerization is below the decomposition temperature of the monomer or mixture of monomers. In preparing the polymers and copolymers of my invention I prefer to use heat and a catalyst which is free from hydrogen or other groups reactive with the isocyanate grouping, e. g., benzoyl peroxide, di-(tertiary-butyl) peroxide, acetyl peroxide, etc., since thereby I am better able to obtain soluble polymers and copolymers.

Illustrative examples of monomeric materials which may be copolymerized with the isocyanates hereinbefore described to produce the new copolymers of this invention are N-dialkyl acrylamides, e. g., N-dimethyl, -diethyl, -dipropyl, -dibutyl, -diamyl, -dihexyl, -dioctyl, etc., acrylamides; the acrylic, α-alkyl acrylic and α-haloacrylic esters of saturated monohydric alcohols, for instance saturated aliphatic monohydric alcohols, e. g., the methyl, ethyl, propyl, isopropyl, butyl, isobutyl, amyl, etc., esters of acrylic, methacrylic, ethacrylic, propacrylic, chloroacrylic, bromoacrylic, etc., acids; the phenyl, benzyl, phenylethyl, etc., esters of the aforementioned acids; vinyl aromatic hydrocarbons, e. g., styrene, α-methyl styrene, dimethyl styrenes, dichlorostyrenes, cyanostyrenes, vinyl naphthalenes, etc.; the vinyl and vinylidene halides, e. g., vinyl and vinylidene chlorides, bromides, etc.; alkyl vinyl ketones, e. g., methyl vinyl ketone, ethyl vinyl ketone, methyl isopropenyl ketone, etc.; itaconic diesters containing a single $CH_2=C<$ grouping, e. g., the dimethyl, diethyl, dipropyl, dibutyl and other saturated aliphatic monohydric alcohol diesters of itaconic acid, diphenyl itaconate, dibenzyl itaconate, di-(phenylethyl) itaconate, etc.; allyl and methallyl esters of saturated aliphatic monocarboxylic acids, e. g., allyl and methallyl acetates, allyl and methallyl propionates, allyl and methallyl valerates, etc.; vinyl thiophene; vinyl pyridine; vinyl pyrrole; nitriles containing a single $CH_2=C<$ grouping, e. g., acrylonitrile, methacrylonitrile, etc. Mixtures of the aforementioned monomeric materials may be employed, if desired, as well as mixtures of such monomer or monomers with other copolymerizable materials containing a $CH_2=C<$ grouping. The material which is mixed and polymerized with the isocyanate in all cases should be copolymerizable with the isocyanate, should contain a $CH_2=C<$ grouping, but should not contain any hydrogen atom or atoms which will react with the isocyanate grouping. In cases where the isocyanate and other monomer are not copolymerizable or are copolymerizable only with difficulty in a two-component system, a third monomer can be added so as to obtain a compatible, homogeneous mass of copolymerizable ingredients.

The copolymers of this invention are prepared by mixing the isocyanate with a different compound of the kind hereinbefore described, numerous examples of which previously have been given. Examples of preferred classes of such compounds are the acrylic compounds which contain a $CH_2=C<$ grouping (especially those containing a singe $CH_2=C<$ grouping), are copolymerizable with the isocyanate and which are free from a hydrogen atom or atoms reactive with the isocyanate grouping, for instance the acrylic esters of saturated aliphatic monohydric alcohols (e. g., methyl, ethyl, propyl, isopropyl, n-butyl, isobutyl, hexyl, etc., acrylates), the N-dialkyl acrylamides and methacrylamides (e. g., N-dimethyl, N-diethyl, N-dipropyl, N-di-n-butyl, etc., acrylamides and methacrylamides), etc.; monovinyl aromatic compounds which are copolymerizable with the isocyanate, which contain a single $CH_2=C<$ grouping and which are free from a hydrogen atom or atoms reactive with the isocyanate grouping, e. g., styrene, the various chlorostyrenes, the various monomethyl and dimethyl styrenes, the various cyanostyrenes, etc.

Among the preferred copolymers of my invention are those which are the products of polymerization of a mixture containing (1) an isocyanate of the kind represented by Formula II, or mixtures thereof (e. g., a mixture of m-allyloxyphenyl isocyanate and p-allyloxyphenyl isocyanate), or of the kind represented by Formula III, e. g., 2-methyl-5-allyloxyphenyl isocyanate, or mixtures thereof, or mixtures containing an o-, m- or p-allyloxyphenyl isocyanate and 2-methyl-5-allyloxyphenyl isocyanate or other isocyanate or isocyanates of the kind embraced by Formula III, and (2) ethyl acrylate, acrylonitrile, styrene or other acrylic ester or other acrylic compound or monovinyl aromatic compound or other compound or compounds of the kinds which are more fully described in the preceding paragraph and elsewhere herein. As indicated hereinbefore, the monomeric isocyanates and copolymerizable mixtures thereof may be polymerized or reacted until products which are soluble in inert organic liquids are obtained or until substantially insoluble, substantaillly infusible polymerization products are secured.

In the preparation of copolymers, the proportions of copolymerizable materials may be varied over a wide range, as desired or as conditions may require, e. g., from, by weight, 1 to 99% of the isocyanate to from 99 to 1% of the other copolymerizable ingredient or ingredients. In all cases the proportions are such that the resulting polymerization product has an average of at least two isocyanate groupings per molecule. Particularly useful copolymer compositions are obtained when the mixture of copolymerizable materials contains, by weight, from about 2 or 3% to about 50% of the isocyanate and from about 50 to 97 or 98% of the other copolymerizable monomer. Thus, I may prepare in accordance with my invention toluene-soluble copolymers of, by weight, from about 50% to about 98% of ethyl acrylate, styrene, acrylonitrile, etc. (or mixtures thereof) and about 2% to about 50% of an isocyanate of the kind with which this invention is concerned, more particularly isocyanates such as are embraced by Formulas II or III, or mixtures thereof, e. g., a mixture of m-allyloxyphenyl isocyanate and p-allyloxyphenyl isocyanate. In producing soluble copolymers for use in treating wool and other textile materials, I prefer to use a mixture of, by weight, about 5% to about 15% of the isocyanate and about 95 to about 85% of the other copolymerizable monomer. When the copolymer is used in such applications no particular advantage ordinarily accrues when the isocyanate is used in an amount much above about 15%, by weight, of the mixed ingredients although more may be used if desired, e. g., the isocyanate may constitute 30 or 40% or even as much as 50% of the polymerizable mixture. Good results have been obtained with a mixture of, by weight, about 10% of the isocyanate and about 90% of the other copolymerizable monomer, e. g., a lower alkyl acrylate and, more particularly, ethyl acrylate.

In order that those skilled in the art better may understand how the present invention may be carried into effect, the following examples are given by way of illustration and not by way of limitation. All parts are by weight.

EXAMPLE 1

*Preparation of p-allyloxyphenyl isocyanate*

(a) To a slurry of 91 grams (0.6 mole) of p-acetaminophenol in 150 cc. of ethanol is added a solution of 26.5 grams (0.65 mole) of 95% sodium hydroxide in 60 cc. of water and 79 grams (0.65 mole) of freshly distilled allyl bromide. After stirring and refluxing for 2 hours, the reaction mass is poured into 1½ liters of ice water. The product is precipitated as an oil that solidifies readily on shaking. The solid, yellow, crude p-allyloxyacetanilide obtained on filtration and drying is used directly in the following reaction without further purification.

(b) The crude allyloxyacetanilide is hydrolized by refluxing with 600 cc. of 10% aqueous hydrochloric acid for 1 hour. Complete solution takes place during the first half hour of refluxing. A decolorizing carbon is added during the last 15 minutes of the reflux period. Filtration by gravity followed by cooling in an ice bath yields 67.5 grams (61% of the theoretical) of colorless, flat prisms of p-allyloxyaniline hydrochloride, M. P. 202°–204° C. An additional 7.5 grams (8.3% of the theoretical) of p-allyloxyaniline is obtained by making the mother liquor alkaline and extracting with ether.

(c) Forty grams (0.22 mole) of p-allyloxyaniline hydrochloride is slurried in 100 cc. of water and made alkaline with a solution of 10 grams (0.24 mole) of 95% sodium hydroxide in 50 cc. of water. The resulting oily amine, which rapidly turns red, is taken up in 60 cc. of toluene and dried over pellets of potassium hydroxide. The amine solution is filtered from the drying agent, which is washed with 15 cc. of toluene, and the combined solutions are then added dropwise to a solution of 65 grams (0.65 mole) of phosgene in 100 cc. of toluene. The addition to the phosgene is carried out over a period of 40 minutes, during which time the temperature is maintained below 10° C. Initially, a pinkish crystalline slurry results, but on heating to reflux, while introducing a small stream of phosgene, complete solution occurs within half an hour. The reaction is continued for an additional 90 minutes, after which the toluene is distilled off at atmospheric pressure, followed by distillation of the amber-colored residue under vacuum. The desired product, p-allyloxyphenyl isocyanate, is obtained as a colorless, mobile liquid, B. P. 64°–65° C. (0.3 mm. pressure). This isocyanate turns from pink to red in color after exposure to air for a few days. It is insoluble in and heavier than water, and hydrolyzes rapidly. The yield is 25.5 grams, which corresponds to 67.5% of the theoretical. Analysis of the product showed the following:

|  | Percent C | Percent H |
|---|---|---|
| Calc'd for $C_{10}H_9NO_2$ | 68.59 | 5.18 |
| Found | 68.87 | 5.40 |

The reaction between the p-allyloxyaniline and phosgene may be represented by the following equation:

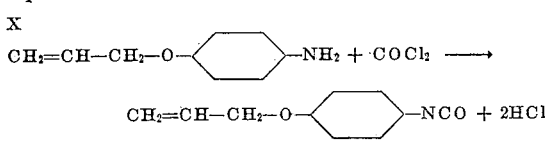

The p-allyloxyphenyl isocyanate can be further characterized by shaking 2 grams of it with 5 cc. of water containing a few drops of 5% aqueous potassium hydroxide solution. Ordinarily no reaction occurs until about 5 cc. of acetone is added to solubilize the isocyanate. Then an immediate precipitation of colorless plates occurs with evolution of heat and carbon dioxide. The resulting solid mass of crystals is filtered and washed with ethanol. The yield is 1.84 grams, M. P. 201.5–203° C. The crystals of sym. bis-(p-allyloxyphenyl) urea are insoluble in water and cold ethanol, but are sparingly soluble in hot ethanol. Crystallization from butanol yields colorless needles having a melting point of 208.5–209° C., and showing the following upon analysis:

|  | Percent C | Percent H | Percent N |
|---|---|---|---|
| Calculated for $C_{19}H_{20}N_2O_3$ | 70.20 | 6.40 | 8.62 |
| Found | 71.20 | 6.53 | 8.63 |

The reaction between p-allyloxyphenyl isocyanate and p-allyloxyaniline also yields sym. bis-(p-allyloxyphenyl) urea, M. P. 207–208° C., and there is no depression in melting point when the two samples are fused together.

EXAMPLE 2

In a manner similar to that described above with particular reference to the preparation of p-allyloxyphenyl isocyanate, the various allyloxytolyl isocyanates are obtained by reacting phosgene with an allyloxytoluidine (or a mixture of the various isomers) corresponding to the allyloxytolyl isocyanate desired. In this way there is produced, for example, 2-methyl-3-allyloxyphenyl isocyanate, 2-methyl-4-allyloxyphenyl isocyanate, 2-methyl-5-allyl-oxyphenyl isocyanate, 2-methyl-6-allyloxyphenyl isocyanate, 3-methyl-2-allyloxyphenyl isocyanate, 3-methyl-4-allyloxyphenyl isocyanate, 3-methyl-5-allyloxyphenyl isocyanate, 3-methyl-6-allyloxphenyl isocyanate, 4-methyl-2-allyloxyphenyl isocyanate, 4-methyl-3-allyloxyphenyl isocyanate, and mixtures thereof.

EXAMPLE 3

| | Parts |
|---|---|
| Ethyl acrylate | 90.0 |
| p-Allyloxyphenyl isocyanate | 10.0 |
| Benzoyl peroxide | 0.4 |
| Toluene (anhydrous) | 67.0 |

The toluene is heated with stirring under reflux in a reaction vessel provided with a stirrer and a reflux condenser, the reaction vessel being placed in a bath maintained at a temperature of about 130° C. While the toluene is refluxing, the mixture of ethyl acrylate and isocyanate, in which the benzoyl peroxide is dissolved, is added dropwise to the hot toluene over a period of 26 minutes. Heating is continued under reflux for an additional 2 hours, at the end of which period the solution becomes light reddish orange in color and refluxing is no longer apparent. The copolymerization reaction proceeds smoothly, and is not vigorous at any time. The copolymer is soluble in the toluene.

The solution of copolymer is cooled, and 100 grams of dry toluene is added thereto. The conversion of monomers to copolymer is 78.5%, as calculated from the percentage of copolymer solids in the toluene solution. When a small portion of the toluene solution is treated with a few drops of ethylene diamine, gelation occurs almost immediately with the formation of a reaction product of the ethylene diamine and the copolymer of ethyl acrylate and p-allyloxyphenyl isocyanate. This shows the high degree of reactivity of the copolymer.

A portion of the toluene solution of the copolymer containing about 29.5% of copolymer solids is diluted with additional dry (anhydrous) toluene to yield a solution containing about 10% by weight of copolymer solids.

A piece of woolen goods (9" x 23" in size) is immersed in the 10% copolymer solution, and passed through squeeze rolls. The impregnated wool contains approximately 8 to 10% of copolymer. The sample is framed, air-dried for a short period, and then heated for 9 minutes at 290° F. After cooling to room temperature, the sample is removed from the frame, allowed to remain undisturbed for about 16 hours and is then measured prior to laundering. The method of laundering is a modification of the standard method of the A. A. T. C. C., and involves heating for 20 to 30 minutes at 240° F. while drying after each washing. After a cycle of 5 washing (10 minutes in soap solution) and drying operations, the dried treated cloth shows a shrinkage of only 3.9%, and a shrinkage of only 4.4% when similarly washed for an additional hour followed by drying. In marked contrast, the untreated woolen cloth when similarly laundered for the same number of 10-minute washings shows a shrinkage of 27.5%, and a shrinkage of 33.6% after washing for an additional hour followed by drying. The treated wool is pliable and soft. Shrinkage data obtained on the treated goods are shown below:

| | Per cent shrinkage |
|---|---|
| After 5 washing cycles of 10 minutes each | 3.9 |
| After 60 minutes' washing | 4.4 |
| After 5 additional washing cycles of 10 minutes each | 5.0 |
| After 60 minutes' washing | 5.6 |
| After 5 additional washing cycles of 10 minutes each and then washing for 60 minutes more | 6.7 |
| After 5 additional washing cycles of 10 minutes each | 6.1 |

EXAMPLE 4

| | Parts |
|---|---|
| Ethyl acrylate | 90.0 |
| p-Allyloxyphenyl isocyanate | 10.0 |
| Benzoyl peroxide | 0.4 | are well mixed, and the resulting homogeneous mixture is heated in a reaction vessel placed on a steam bath. After heating in this manner for about 2½ minutes, an exothermic reaction takes place. Heating of the reaction mass is continued for an additional hour. The resulting liquid copolymer is a very viscous mass but is not so viscous as the polymer obtained when ethyl acrylate alone is similarly polymerized. The liquid copolymer has a definite reddish orange color at the end of the reaction period. It is soluble in toluene.

A small portion of the copolymer is dissolved in toluene, and the resulting solution is treated with a few drops of ethylene diamine. Gelation occurs almost immediately upon stirring in the ethylene diamine, forming a reaction product thereof with the copolymer of the aforementioned monomers. This rapidity of gelation indicates the high degree of reactivity of the copolymer.

EXAMPLE 5

| | Parts |
|---|---|
| p-Allyloxyphenyl isocyanate | 95 |
| Benzoyl peroxide | 5 | are heated together under an atmosphere of carbon dioxide in a closed reaction vessel which is placed in an oil bath maintained at 110° C. Heating is continued at a bath temperature of about 110° C. until a toluene-soluble polymer of a desired viscosity has been obtained, for example for a period ranging from 60 to 200 hours or longer. Further heating at the same temperature, with or without additional catalyst as desired or as conditions may require, results in conversion of the viscous polymer to a gel.

The polymerization rate can be accelerated by subjecting the catalyzed isocyanate to heat and ultraviolet light.

EXAMPLE 6

Same as in Example 5 with the exception that 95 parts of p-methallyloxyphenyl isocyanate is used in place of 95 parts of p-allyloxyphenyl isocyanate, and heating to effect polymerization is at a bath temperature of about 120° C. Similar results are obtained.

EXAMPLE 7

Same as in Example 5 with the exception that 95 parts of 2-methyl-5-allyloxyphenyl isocyanate is employed instead of 95 parts of p-allyloxyphenyl isocyanate, and heating to effect polymerization is first at a bath temperature of about 100° C. and finally at a bath temperature of 120° to 130° C. Similar results are obtained.

EXAMPLE 8

| | Parts |
|---|---|
| Methyl acrylate | 95 |
| p-Allyloxyphenyl isocyanate | 5 |
| Benzoyl peroxide | 1 |
| Toluene (anhydrous) | 60 |

The toluene is placed in a flask and heated with stirring under reflux while maintaining a bath temperature of 130° to 135° C. The mixture of the other ingredients is added dropwise over a period of 25 minutes. Heating is continued under reflux for 5 hours. One hundred parts of dry toluene is then added, after which about 110 parts of solvent is distilled off under reduced pressure on a steam bath in order to remove any unreacted monomers. When a small portion of the toluene solution of the copolymer of methyl acrylate and isocyanate is treated with a few drops of ethylene diamine, gelation occurs. This shows the high degree of reactivity of the copolymer.

The toluene solution of the copolymer is diluted with sufficient dry toluene to yield a solution containing about 10% of copolymer solids. The dilute solution is used in treating woolen goods as has been described under Example 3. Similar results are obtained. It also can be employed in treating other fabric materials, for example cotton and rayon textile materials, fabrics made of or containing polyacrylonitrile fibers, to impart improved properties thereto, for instance crease resistance.

EXAMPLE 9

| | Parts |
|---|---|
| Arcylonitrile | 92.5 |
| p-Allyloxyphenyl isocyanate | 7.5 |
| Benzoyl peroxide | 0.5 |

The acrylonitrile and isocyanate are mixed and added to a glass tube to which the benzoyl peroxide previously has been added. The mixture is blanketed with carbon dioxide, and the container is stoppered until ready for sealing. Thereafter it is cooled in Dry Ice and sealed while evacuating with a water pump, flushing out the container four or five times with carbon dioxide before sealing. The sealed container is allowed to stand for about 24 hours at room temperature, after which it is subjected to irradiation with ultraviolet light, using a Cooper-Hewitt lamp placed about 12 inches from the container.

After a total of 48 hours' exposure, irradiation is discontinued. The solid copolymer of acrylonitrile and p-allyloxphenyl isocyanate produced in this manner is capable of undergoing further reaction, and hence is adapted for use in the preparation of molding (moldable) compositions from which heat-resistant molded articles of various shapes can be made.

EXAMPLE 10

| | Parts |
|---|---|
| Vinyl acetate | 85.0 |
| p-Allyloxyphenyl isocyanate | 15.0 |
| Benzoyl peroxide | 0.8 |

The same procedure is followed as described under Example 9. A moderately hard copolymer is obtained when the mixture of monomers is subjected to irradiation for periods ranging from about 200 to 300 hours, and the unreacted monomers are distilled from the reaction mass. Gelation occurs when a solution of the copolymer is treated with a small amount of ethylene diamine.

The copolymer of this example may be used, for instance, as a modifier of other resinous materials, as a component of coating compositions or, alone or in combination with other resins, in the production of cast or molded articles.

EXAMPLE 11

| | Parts |
|---|---|
| Styrene | 90.0 |
| p-Allyloxyphenyl isocyanate | 10.0 |
| Benzoyl peroxide | 0.4 |

A mixture of the above ingredients is heated under anhydrous reflux conditions in a reaction vessel (previously flushed out with carbon dioxide by using a pellet of Dry Ice) that is placed in an oil bath maintained at about 110° C. Heating under reflux is continued until the viscous copolymer, which forms during the first part of the reaction period and is soluble in toluene, has been converted into a gelled copolymer which is swollen by toluene but does not dissolve therein. Such a gelled copolymer is usually obtained after refluxing for about 15-20 hours. The reactive, gelled copolymer can be used in the production of molding compositions or as a modifier of other resinous materials to impart improved properties thereto.

EXAMPLE 12

Same as Example 3 with the exception that instead of 10 parts of p-allyloxyphenyl isocyanate there is used 10 parts of p-methallyloxyphenyl isocyanate. Similar results are obtained.

EXAMPLE 13

Same as in Example 3 with the exception that in place of 90 parts of ethyl acrylate there is employed 90 parts of styrene. Similar results are obtained.

EXAMPLE 14

| | Parts |
|---|---|
| Ethyl acrylate | 87.5 |
| 2-methyl-5-allyloxyphenyl isocyanate | 12.5 |
| Benzoyl peroxide | 0.5 |
| Toluene (anhydrous) | 75.0 |

Essentially the same procedure is followed in preparing the copolymer and in using a solution thereof in the treatment of woolen goods as was described under Example 3. Similar results are obtained.

EXAMPLE 15

| | Parts |
|---|---|
| Diallyl cyanamide | 12 |
| Ethyl acrylate | 135 |
| p-Allyloxyphenyl isocyanate | 3 |
| Benzoyl peroxide | 3 | are mixed together, and the resulting mixture is heated in a closed container under anhydrous conditions for 24 hours at 40° C. to yield a solid, resinous copolymer. During copolymerization, an exothermic reaction takes place. This copolymer can be used alone or admixed with various modifiers, e. g., resorcinol-formaldehyde resins, alkyd resins, etc., in the production of adhesive compositions.

EXAMPLE 16

| | Parts |
|---|---|
| Diallyl cyanamide | 12 |
| Acrylonitrile | 135 |
| p-Allyloxyphenyl isocyanate | 3 |
| Benzoyl peroxide | 3 |

The same procedure is followed as described under Example 15 with the exception that the heating period is only 10 hours. An exothermic reaction takes place, and a powdery, solid copolymer is obtained. This copolymer is suitable for use in the production of films, fibers, rods, etc. e. g., by dissolving in a solvent which preferably is non-reactive with the isocyanate grouping in the copolymer, and then spinning the resulting solution of the copolymer, followed by stretching the spun fiber to orient the molecules along the fiber axis.

A copolymer having similar characteristics is obtained when 3 parts of azoisobutyronitrile is substituted for 3 parts of benzoyl peroxide in the above formulation.

EXAMPLE 17

| | Parts |
|---|---|
| Propyl acrylate | 50 |
| p-Allyloxyphenyl isocyanate | 50 |
| Benzoyl peroxide | 1 | are well mixed, and the resulting homogeneous mixture is heated with stirring under a blanket of carbon dioxide in a reaction vessel placed on a steam bath. Heating in this manner is continued for 3-4 hours to obtain a reactive copolymer of the propyl acrylate and isocyanate.

EXAMPLE 18

Same as in Example 17 with the exception that 50 parts of styrene is used instead of 50 parts of propyl acrylate. A reactive copolymer of styrene and p-allyloxyphenyl isocyanate is obtained.

EXAMPLE 19

| | Parts |
|---|---|
| Acrylonitrile | 50 |
| Ethyl acrylate | 50 |
| p-Allyloxyphenyl isocyanate | 50 |
| Benzoyl peroxide | 3 | are heated together in a reaction vessel placed in an oil bath maintained at 120°-130° C. A blanket of carbon dioxide is maintained over the reaction mass while stirring the latter. Heating is continued for from 10 to 20 hours until the resulting reactive copolymer has the desired average molecular weight.

EXAMPLE 20

Same as in Example 19 with the exception that 50 parts of styrene is used in place of 50 parts of acrylonitrile. Similar results are obtained.

EXAMPLE 21

Same as in Example 19 with the exception that 50 parts of styrene is employed instead of 50 parts of ethyl acrylate. Similar results are obtained.

As will be apparent to those skilled in the art, my invention is not limited to the use of the specific ingredients and particular proportions thereof that are given in the above illustrative examples. Thus, instead of the particular isocyanates employed in the examples, any other isocyanate (or mixture of isocyanates) of the kind embraced by Formula I can be used. Likewise, monomeric materials other than the particular monomers specified in some of the examples can be copolymerized with the isocyanate. For example, in two-, three- or four-component systems (or in even higher multi-component systems) I can use methyl acrylate, propyl acrylate, n-butyl acrylate, amyl acrylate, hexyl acrylate, methyl methacrylate, ethyl methacrylate, acrylonitrile, methacrylonitrile, allyl acetate, dichlorostyrene, N-dibutyl acrylamide or any other compound which is copolymerizable with the isocyanate, which contains a $CH_2=C<$ grouping, more particularly a single $CH_2=C<$ grouping, and which is free from a hydrogen atom or atoms reactive with the isocyanate grouping, numerous examples of which compounds previously have been given. If desired, mixtures of monomers may be copolymerized with a single isocyanate or with a plurality of isocyanates.

Catalysts other than benzoyl peroxide also can be employed, but if a catalyst is used it is desirable to use one which contains no hydrogen atom or atoms that will react with the isocyanate grouping. Examples of catalysts that can be employed are inorganic peroxides such, for example, as barium peroxide, etc.; dialkyl peroxides, e. g., lauryl peroxide, stearyl peroxide, di-(tertiary-butyl) peroxide, etc.; symmetrical di-acyl peroxides, e. g., acetyl peroxide, lauroyl peroxide, stearoyl peroxide, etc.; unsymmetrical or mixed diacyl peroxides, e. g., acetyl benzoyl peroxide etc. Any suitable amount of catalyst may be used, but in general the catalyst concentration will be within the range of about 0.05 to 2 or 3% by weight of the monomeric material or of the mixed copolymerizable materials.

My new chemical compounds are useful not only in the production of polymers and copolymers but also as intermediates in the preparation of derivatives thereof. For example, the monomers may be used to produce bis-ureas, or they may be nuclearly halogenated (e. g., chlorinated, brominated, etc.), nuclearly sulfonated, etc. Or, the polymers themselves may be halogenated (e. g. chlorinated, brominated, etc.), hydrogenated, hydrolyzed, alcoholyzed, sulfonated, etc.

The polymerization products (polymers and copolymers) of this invention have a wide variety of commercial applications. For instance, they can be employed as adhesives, e. g., in bonding sheets of wood veneer to each other or to base materials formed of wood or of other substance, in bonding metal to metal, metal to rubber, wood to metal, rubber to metal, glass or ceramic materials to metal, glass to glass in making, for example, laminated safety glass, etc.

In addition to their use in treating cotton, rayon, silk, wool, and other textile materials, my new polymers and copolymers also can be employed for treating paper, leather, resin-coated surfaces, etc. They also may be used in treating dyes prior to dyeing a fabric material or they may be employed to finish dyed fabrics. Because of the reactive nature of these polymeric and copolymeric compositions they also have application in anchoring fireproofing and rainproofing agents on fabric and other materials. In a similar manner, they may be employed for the purpose of anchoring dyes in fabrics.

In coating compositions the isocyanate polymerization products of this invention may be used directly to secure cured films, the water vapor present in the air ordinarily being sufficient to accelerate insolubilization and cross-linking. Alternatively, insolubilization and cross-linking can be achieved through the introduction of unsaturated components into the polymeric or copolymeric isocyanate. Unsaturation in the polymeric or copolymeric isocyanate is secured by reacting the polymer or copolymer with unsaturated compounds possessing appropriate functional groups, e. g., amino, hydroxy, carboxy, etc. Illustrative examples of compounds that thus may be reacted with the polymeric or copolymeric isocyanate to introduce unsaturation therein are acrylic acid, methacrylic acid, sorbic acid, undecylenic acid, linoleic acid, eleostearic acid, allyl alcohol, methallyl alcohol, undecenyl alcohol, methylol acrylamide, vinyl phenol, allyl amine, amino styrenes, methyl amino styrenes, etc.

The hardenable or potentially hardenable polymers and copolymers of my invention can be used alone or with fillers, dyes, pigments, opacifiers, etc., in a wide variety of casting, molding and laminating applications, as impregnants and surface-coating materials and for numerous other purposes. Thus, they may be employed, for instance, in protectively coating surfaces of metal, wood, synthetic resins, etc., or as a finish coating over painted surfaces.

These new polymers and copolymers can be modified by the addition of other reactive or non-reactive materials, or they themselves may be used as modifiers of other substances which are reactive or non-reactive with the copolymer. Illustrative examples of materials with which the reactive copolymers of this invention can be combined are compounds or substances containing one or more —OH groups, for instance: glycol, diethylene glycol, glycerine and other polyhydric alcohols; fatty oils of the kind exemplified by castor oil; diglycerides; alkyd resins containing —OH groups, including polymerizable unsaturated alkyd resins containing —OH groups; urea-formaldehyde reaction products, e. g., mono- and dimethylol ureas and their partial condensation products; melamine-formaldehyde reaction products, e. g., di-, tri-, tetra-, penta- and hexa-methylol melamines and their partial condensation products; acetylene urea; phenol-formaldehyde reaction products, e. g., saligenin and the more highly condensed phenol alcohols; polyvinyl phenols; sugars and starches; polyvinyl alcohol and partially esterified and etherified polyvinyl alcohols; polyallyl and polymethallyl alcohols and partially esterified and etherified polyallyl and polymethallyl alcohols; cellulose and cellulose derivatives containing free hydroxyl groups, e. g., partially esterified cellulose, partially etherified cellulose, etc.; partially or wholly methylolated acrylamides; water-soluble natural gums, e. g., agar agar, tragacanth, pectin, etc.; silicols and their partial condensation products, e. g., mono-, di- and trimethyl silicols and mixtures thereof, mono-, di- and triphenyl silicols and mixtures thereof, mixtures of any or all of the aforementioned methyl and phenyl silicols, partial condensation products of the aforementioned silicols and mixtures thereof; and acids, including, for example, cyanuric acid and derivatives thereof containing a hydrogen atom which is reactive with an isocyanate grouping.

My new polymers and copolymers also can be combined with nitrogen-containing materials, e. g., ethylene imine, polyethylene imines, ethylene diamine, diethylene triamine and other polyethylene amines, polymethylene diamines, alkanolamines (e. g., mono-, di- and triethanolamines, etc.), gelatin, chitin, monoamino and polyamino compounds such, for instance, as wool, silk, zein, casein, regenerated fibers from soyabean, casein, keratin, collagen, etc., to yield new and useful materials or articles of manufacture.

From the foregoing it will be seen that the polymers and copolymers of my invention can be converted into useful derivatives by bringing them into reactive relationship with a compound containing a hydrogen atom which is reactive with the isocyanate grouping that is present in the polymer or copolymer. Among such reactive compounds are, as has been mentioned hereinbefore, those which contain an —OH group, for instance, compounds represented by the general formula ROH where R represents hydrogen or an alkyl radical, e. g., methyl, ethyl, propyl, butyl, isobutyl, etc.

Valuable polymers and copolymers also may be prepared by reacting an amine of the kind represented by Formula VI, e. g., an allyloxy-aniline, with phosgene to form a carbamyl chloride thereof, for instance an allyloxyphenylcarbamyl chloride. This chloride then is polymerized alone or with a monomeric material which is copolymerizable therewith, e. g., styrene, ethyl acrylate or other monomer or monomers such as mentioned hereinbefore with particular reference to the copolymerization of isocyanates of the kind embraced by Formula I.

The polymers and copolymers of this invention are especially valuable for use in the treatment of textiles and similar materials and in the preparation of laminated and molded articles. Thus, they can be employed in treating sheet materials, e. g., paper, fabric materials of cotton, linen, asbestos, etc., which, with or without subsequent treatment with other resinous materials, e. g., melaminealdehyde resins, ureaaldehyde resins, alkyd resins, etc., are thereafter dried, superimposed and laminated under heat and pressure to yield laminated articles wherein the polymer or copolymer has become an integral part of the sheet material. They also can be used advantageously in bonding together wood flour, alpha-cellulose and other finely divided fillers to form molded articles of manufacture. In the case of those fillers that contain a hydrogen atom or atoms reactive with the isocyanate grouping, the polymerization product reacts therewith to yield a product in which the polymer or copolymer is chemically bound therein. Finely divided fillers also can be pretreated with these new polymerization products prior to incorporation in conventional molding compositions, e. g., phenol-formaldehyde, urea-formaldehyde, melamine-formaldehyde, etc., molding compositions. Or, the filler combined with phenol-formaldehyde, urea-formaldehyde or other synthetic resin can be treated with these new polymers or copolymers during the preparation of the molding composition.

It was quite surprising and unexpected to find that the new isocyanates of this invention could be prepared by effecting reaction between phosgene and an amine of the kind represented by Formula VI, since ordinarily it would be expected that when phosgene was brought into contact with such an amine cleavage would occur at the ether linkage and the desired isocyanates would not be produced.

I claim:

1. A chemical compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical.

2. A chemical compound represented by the formula $CH_2=CH—CH_2—O—C_6H_4—N=C=O$.

3. p-Allyloxyphenyl isocyanate.

4. A composition comprising a product of polymerization of a polymerizable mass, said mass including a compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical.

5. A substance comprising the product of reaction of (1) a product of polymerization of a polymerizable mass, said mass including a compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical, and (2) a compound containing a hydrogen atom which is reactive with the isocyanate grouping present in the polymerization product of (1).

6. A polymerizable composition comprising (1) an isocyanate represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical, and (2) a different monomeric compound which is copolymerizable with the isocyanate of (1), which contains a $CH_2=C<$ grouping and which is free from a hydrogen atom reactive with the isocyanate grouping.

7. A product comprising the polymerized composition of claim 6.

8. A polymerizable composition as in claim 6 wherein the isocyanate of (1) is an allyloxyphenyl isocyanate.

9. A polymerizable composition comprising (1) an isocyanate represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus, and (2) a vinyl compound which is copolymerizable with the isocyanate of (1) and which is free from a hydrogen atom reactive with the isocyanate grouping.

10. A polymerizable composition as in claim 9 wherein Ar represents a phenylene radical.

11. A composition comprising a copolymer of copolymerizable ingredients including (1) an isocyanate represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus, and (2) a vinyl compound which is copolymerizable with the isocyanate of (1) and which is free from a hydrogen atom reactive with the isocyanate grouping.

12. A composition comprising a copolymer as in claim 11 wherein R represents an allyl radical.

13. A composition comprising a copolymer as in claim 11 wherein Ar represents a phenylene radical.

14. A composition comprising a copolymer of copolymerizable ingredients including (1) an isocyanate represented by the general formula RO—Ar—N=C=O wherein Ar represents a phenylene radical, R represents a monovalent, primary, ethylenically unsaturated, aliphatic radical having at least 3 and not more than 8 carbon atoms, and (2) an acrylic compound which is copolymerizable with the isocyanate of (1) and which is free from a hydrogen atom reactive with the isocyanate grouping.

15. A copolymer of copolymerizable ingredients including, by weight, (1) from about 2% to about 50% of an allyloxyphenyl isocyanate and (2) from about 50% to about 98% of an acrylic ester which is copolymerizable with the isocyanate of (1) and which is free from a hydrogen atom reactive with the isocyanate grouping.

16. A copolymer of copolymerizable ingredients including, by weight, (1) from about 2% to about 50% of an allyloxyphenyl isocyanate and (2) from about 50% to about 98% of acrylonitrile.

17. A copolymer of copolymerizable ingredients including, by weight, (1) from about 2% to about 50% of an allyloxyphenyl isocyanate and (2) from about 50% to about 98% of styrene.

18. The method of preparing a chemical compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical, said method comprising effecting reaction between phosgene and a compound represented by the general formula RO—Ar—NH₂ wherein R and Ar have the same meanings as given above and in which the —OR and NH₂ groupings are each attached directly to the aromatic nucleus of the divalent aromatic hydrocarbon radical represented by Ar in the said formula, said reaction being effected while the said reactants are in contact with each other in a liquid medium in which they are inert and at a temperature ranging from —10° C. up to the reflux temperature of the reaction mass, and isolating a compound represented by the first formula above mentioned from the resulting reaction mass.

19. A method of preparing a new synthetic composition which comprises polymerizing under anhydrous conditions a polymerizable mass including a compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical.

20. The method which comprises polymerizing under anhydrous conditions a compound represented by the general formula RO—Ar—N=C=O wherein Ar represents a divalent aromatic hydrocarbon radical, R represents a monovalent, primary, ethylenically unsaturated, aliphatic radical having at least 3 and not more than 8 carbon atoms, and the —OR and —N=C=O groupings are each attached directly to the aromatic nucleus of the said divalent radical, thereby to obtain a polymeric product containing a reactive isocyanate grouping, and bringing the said product into reactive relationship with a compound containing a hydrogen atom which is reactive with the isocyanate grouping present in the said product.

21. A polymer of p-allyloxyphenyl isocyanate.

22. A polymerizable composition comprising (1) p-allyloxyphenyl isocyanate and (2) a different monomeric compound which is copolymerizable with the isocyanate of (1), which contains a CH₂=C< grouping and which is free from a hydrogen atom reactive with the isocyanate grouping.

23. A product comprising the polymerized composition of claim 22.

24. A polymerizable composition comprising p-allyloxyphenyl isocyanate and an alkyl acrylate.

25. A composition comprising a copolymer of copolymerizable ingredients including p-allyloxyphenyl isocyanate and an alkyl acrylate.

26. A composition comprising a copolymer of copolymerizable ingredients including p-allyloxyphenyl isocyanate and ethyl acrylate.

27. A substance comprising the product of reaction of (1) a polymer of p-allyloxyphenyl isocyanate and (2) a compound containing a hydrogen atom which is reactive with the isocyanate grouping in the polymer of (1).

28. The method of preparing a new synthetic composition which comprises polymerizing, under anhydrous conditions, a polymerizable composition comprising p-allyloxyphenyl isocyanate.

VERNON P. WYSTRACH.

References Cited in the file of this patent

UNITED STATES PATENTS

| Number | Name | Date |
| --- | --- | --- |
| 2,334,476 | Coffman | Nov. 16, 1943 |
| 2,468,713 | Kropa et al. | Apr. 26, 1949 |
| 2,537,064 | Kropa et al. | Jan. 9, 1951 |